United States Patent
Cecchini, III

(10) Patent No.: US 7,698,890 B1
(45) Date of Patent: Apr. 20, 2010

(54) PROPULSION SYSTEM

(76) Inventor: Louis R. Cecchini, III, 6035 Nana Dr., Hughesville, MD (US) 20637

( * ) Notice: Subject to any disclaimer, the term of this patent is extended or adjusted under 35 U.S.C. 154(b) by 308 days.

(21) Appl. No.: 11/782,034

(22) Filed: Jul. 24, 2007

(51) Int. Cl.
*F02C 1/02* (2006.01)
*B60K 3/00* (2006.01)

(52) U.S. Cl. ............................ 60/409; 60/407; 180/165; 180/302

(58) Field of Classification Search .................. 60/409, 60/407, 413, 412; 180/302, 2.1, 165, 65.1, 180/65.21

See application file for complete search history.

(56) References Cited

U.S. PATENT DOCUMENTS

| | | | | | |
|---|---|---|---|---|---|
| 3,925,984 | A | * | 12/1975 | Holleyman | 60/412 |
| 4,043,126 | A | * | 8/1977 | Santos | 60/412 |
| 4,060,987 | A | * | 12/1977 | Fisch et al. | 60/412 |
| 4,163,367 | A | * | 8/1979 | Yeh | 180/302 |
| 4,370,857 | A | * | 2/1983 | Miller | 60/413 |
| 4,383,589 | A | * | 5/1983 | Fox | 60/412 |

* cited by examiner

*Primary Examiner*—Thomas E Lazo

(57) ABSTRACT

A propulsion system. An illustrative embodiment of the propulsion system includes a drive shaft, a flywheel drivingly engaged by the drive shaft, a turbine unit having a plurality of turbine blades drivingly engaging the drive shaft and an air manifold having a plurality of air manifold nozzles directed toward the plurality of turbine blades, and an air tank reservoir pneumatically connected to the air manifold.

10 Claims, 2 Drawing Sheets

PROPULSION SYSTEM

FIELD

The present disclosure relates to a propulsion system for vehicles. More particularly, the present disclosure relates to a propulsion system which utilizes compressed air to rotate a drive shaft in a lightweight vehicle.

BACKGROUND

Efforts to conserve vehicle fuel have become increasingly intense in recent years due to the rising cost of gasoline. Gasoline-operated internal combustion engines are the most widely-used type of engine for automobiles and are also relatively inefficient. Therefore, recent fuel conservation efforts have included designing engines which are capable of consuming alternative types of fuels.

SUMMARY

The present invention is generally directed to a propulsion system. An illustrative embodiment of the propulsion system includes a drive shaft, a flywheel drivingly engaged by the drive shaft, a turbine unit having a plurality of turbine blades drivingly engaging the drive shaft and an air manifold having a plurality of air manifold nozzles directed toward the plurality of turbine blades, and an air tank reservoir pneumatically connected to the air manifold.

BRIEF DESCRIPTION OF THE DRAWINGS

The disclosure will now be made, by way of example, with reference to the accompanying drawings, in which.

DETAILED DESCRIPTION

Figure 1:
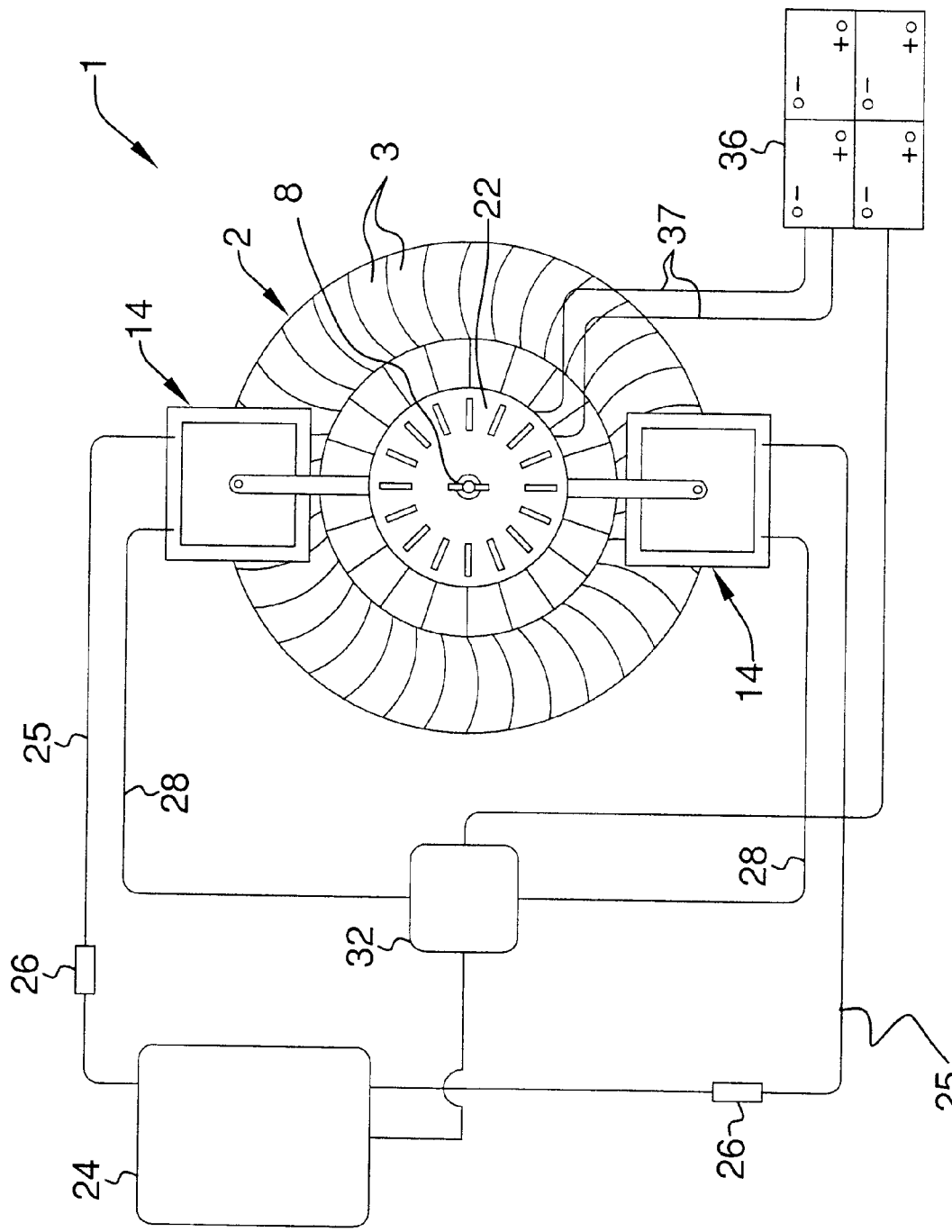
FIG. 1 is a schematic diagram of an illustrative embodiment of the propulsion system.

Referring to the drawings, an illustrative embodiment of the propulsion system is generally indicated by reference numeral 1. As shown in FIG. 1, the propulsion system 1 includes an elongated drive shaft 8 which drivingly engages a flywheel 10. In typical application, the flywheel 10 is coupled to a transmission (not shown) in a vehicle such as a lightweight car or truck, for example. A turbine unit 2 includes multiple turbine blades 3 which drivingly engage the drive shaft 8 according to the knowledge of those skilled in the art. An air manifold 4 includes multiple air manifold nozzles 5 which are directed toward the turbine blades 3 in such a manner that air (not shown) ejected from the manifold nozzles 5 strikes the turbine blades 3 and rotates the turbine blades 3 and the drive shaft 8. An air tank reservoir 24 (FIG. 1) is pneumatically connected to the air manifold nozzles 5 through an air inlet line 25. A one-way valve 26 is typically provided in the air inlet line 25 to control the flow of compressed air through the air inlet line 25. In some embodiments, the manifold nozzles 5 are oriented at various angles with respect to the turbine blades 3. One angle of the air manifold nozzles 5 would cause the air ejected therefrom to strike the turbine blades 3 at a direct angle for initial startup of the propulsion system 1. Once the RPMs of the turbine blades 3 increased, another angle of the air manifold nozzles 5 would facilitate rotation of the turbine blades 3 at greater speed as the air ejected from those air manifold nozzles 5 strikes the turbine blades 3 at other angles.

At least one rotary cylinder/piston drive unit 14 includes multiple cylinders 15 and a lightweight air piston 16 reciprocally mounted in each cylinder 15. Each air piston 16 is typically fitted with a lightweight neoprene cup-type compression ring (not shown). The cylinders 15 are coupled to the drive shaft 8. As shown in FIG. 1, the air tank reservoir is pneumatically connected to the cylinder 15 of each cylinder/piston drive unit 14 through an air inlet line 25 typically having a one-way valve 26. An air outlet line 28 typically extends from the cylinder 15. Accordingly, compressed air (not shown) from the air tank reservoir 24 is directed into the cylinders 15 and against the air pistons 16, driving the air piston 16 in a power stroke inside the respective cylinders 15 and rotating the drive shaft 8. Upon reciprocation of each air piston 16 back to the return position, air is discharged from the cylinders 15 through the air outlet line 28.

Figure 2:
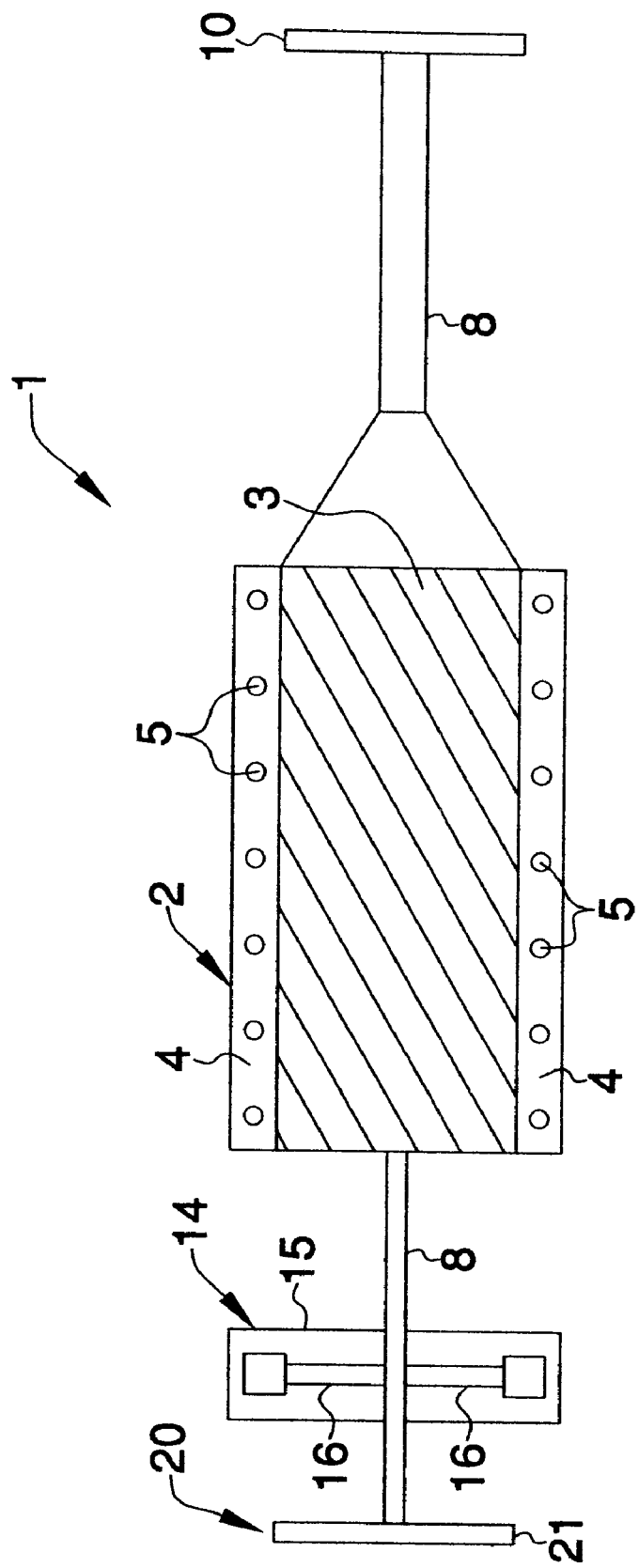
FIG. 2 is a cross-sectional view of an illustrative embodiment of the propulsion system including an electromagnet unit, a cylinder/piston unit and a turbine unit drivingly engaging a drive shaft.

In some embodiments, an electromagnet unit 20 is drivingly coupled to the drive shaft 8. The electromagnetic unit 20 typically includes a rotor electromagnet 21 (FIG. 2) which is coupled to the drive shaft 8 and a stator electromagnet (FIG. 1) which may be provided on the turbine unit 2, for example. The stator electromagnet 22 magnetically interfaces with the rotor electromagnet 21. As shown in FIG. 1, batteries 36 are electrically connected to the stator electromagnet 22 typically through wiring 37. A microcontroller is connected to the electromagnet unit 20. The microcontroller 32 is further connected to the drive shaft 8 in such a manner that the microcontroller 32 is adapted to sense a low torque of the drive shaft 8, according to the knowledge of those skilled in the art, during operation of the propulsion system 1. Accordingly, in the event that it senses a low torque of the drive shaft 8, the microcontroller 32 operates the electromagnet unit 20, augmenting rotation of the drive shaft 8.

In typical application, the propulsion system 1 is installed in a lightweight vehicle (not shown). Accordingly, the flywheel 10 (FIG. 2) is drivingly coupled to the transmission (not shown) of the vehicle. The various control elements of the turbine unit 2, the rotary cylinder/piston drive unit 14 and the electromagnet unit 20 are connected to the accelerator (not shown) of the vehicle. In operation, the air tank reservoir 24 is filled with a supply of compressed air (not shown) from an external compressed air source (not shown). Compressed air (not shown) flows from the air tank reservoir 24, through the air inlet line 25 to the air manifold 4 (FIG. 2) of the turbine unit 2, where the compressed air is ejected through the air manifold nozzles 5 against the turbine blades 3. Therefore, the turbine blades 3 rotate the drive shaft 8 and the flywheel 10 transmits torque to the transmission (not shown) of the vehicle. In some applications, the manifold nozzles 5 are oriented at various angles with respect to the turbine blades 3. One angle of the air manifold nozzles 5 would cause the air ejected therefrom to strike the turbine blades 3 at a direct angle for initial startup of the propulsion system 1. Once the RPMs of the turbine blades 3 increased, another angle of the air manifold nozzles 5 would facilitate rotation of the turbine blades 3 at greater speed as the air ejected from those air manifold nozzles 5 strikes the turbine blades 3 at other angles.

As the compressed air drives the turbine blades 3 of the turbine unit 2, compressed air is typically also distributed from the air tank reservoir 24, through the air inlet line 25 to the rotary cylinder/piston drive unit 14. Accordingly, the compressed air drives the air piston 16 in each cylinder 15 in a drive stroke which facilitates rotation of the drive shaft 8. Upon reciprocation of each air piston 16 back to the return position, air is discharged from the cylinders 15 typically through the air outlet line 28 (FIG. 1).

Under some circumstances, the electromagnet unit 20 augments rotation of the drive shaft 8 such as in the event that the microcontroller 32 detects a torque of the drive shaft 8 which is below a predetermined torque value, as may occur under certain driving conditions, for example. Accordingly, the microcontroller 32 facilitates operation of the electromagnet unit 20, which additionally rotates the drive shaft 8 to increase the torque of the drive shaft 8. The microcontroller may be adapted to terminate further operation of the electromagnet unit 20 in the event that the microcontroller 32 subsequently detects torque which is higher than the predetermined torque value.

While the illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A propulsion system, comprising:
   a drive shaft;
   a flywheel drivingly engaged by said drive shaft;
   a turbine unit having a plurality of turbine blades drivingly engaging said drive shaft and an air manifold having a plurality of air manifold nozzles directed toward said plurality of turbine blades;
   an air tank reservoir pneumatically connected to said air manifold; and
   at least one cylinder and at least one air piston provided in said at least one cylinder and drivingly coupled to said drive shaft, and wherein said air tank reservoir is pneumatically connected to said at least one cylinder.

2. The propulsion system of claim 1 further comprising an electromagnetic unit drivingly coupled to said drive shaft and a battery connected to said electromagnetic unit.

3. The propulsion system of claim 2 further comprising a microcontroller connected to said electromagnetic unit.

4. The propulsion system of claim 2 wherein said electromagnetic unit comprises a rotor electromagnet drivingly coupled to said drive shaft and a stator electromagnet magnetically interfacing with said rotor electromagnet.

5. The propulsion system of claim 4 further comprising a microcontroller connected to said stator electromagnet.

6. A propulsion system, comprising:
   a drive shaft;
   a flywheel drivingly engaged by said drive shaft;
   a turbine unit having a plurality of turbine blades drivingly engaging said drive shaft and an air manifold having a plurality of air manifold nozzles directed toward said plurality of turbine blades;
   an air tank reservoir pneumatically connected to said air manifold; and
   a rotary cylinder/piston drive unit having a plurality of cylinders and a plurality of air pistons provided in said plurality of cylinders, respectively, and drivingly coupled to said drive shaft, said plurality of cylinders pneumatically connected to said air tank reservoir.

7. The propulsion system of claim 6 further comprising an electromagnetic unit drivingly coupled to said drive shaft and a battery connected to said electromagnetic unit.

8. The propulsion system of claim 7 further comprising a microcontroller connected to said electromagnetic unit.

9. The propulsion system of claim 7 wherein said electromagnetic unit comprises a rotor electromagnet drivingly coupled to said drive shaft and a stator electromagnet magnetically interfacing with said rotor electromagnet.

10. The propulsion system of claim 9 further comprising a microcontroller connected to said stator electromagnet.

* * * * *